May 29, 1928.
A. J. KERCHER ET AL
1,671,593
TEMPERATURE CONTROL SYSTEM
Filed March 5, 1927
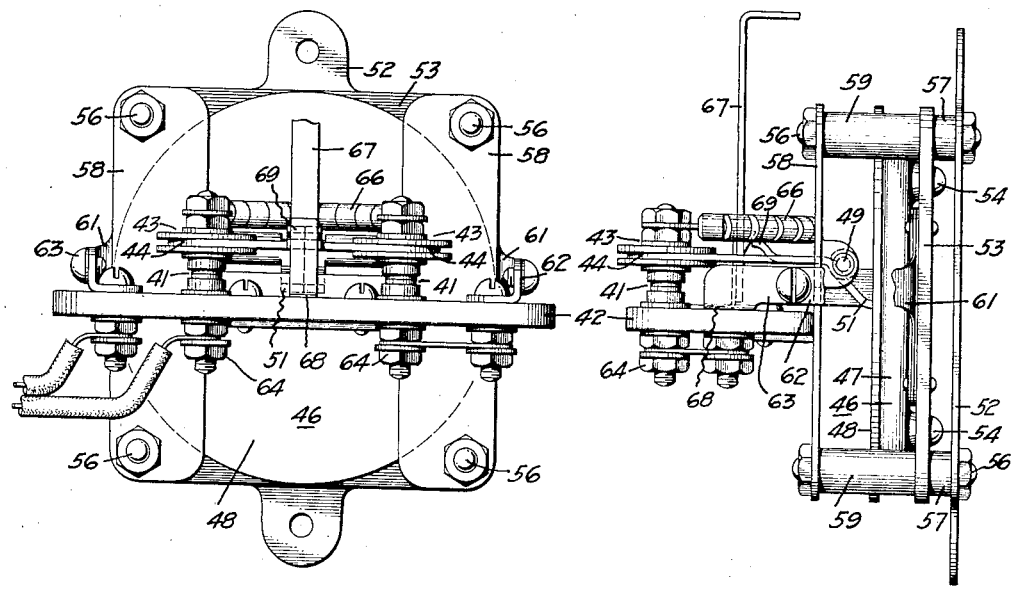
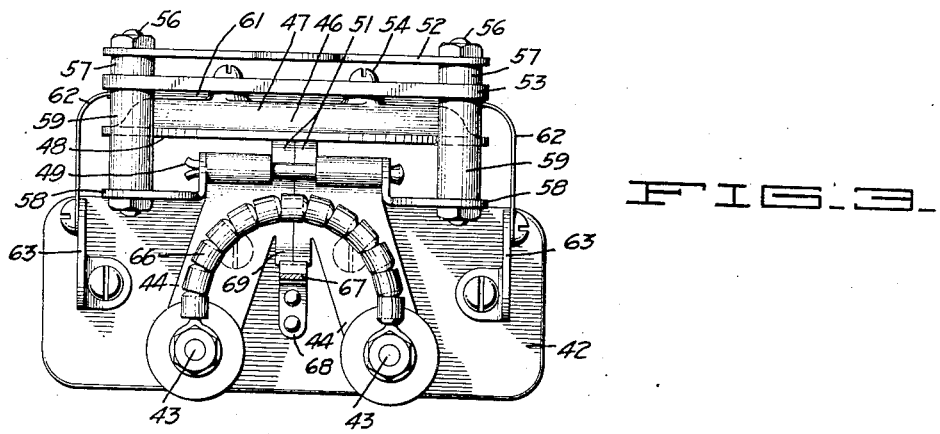
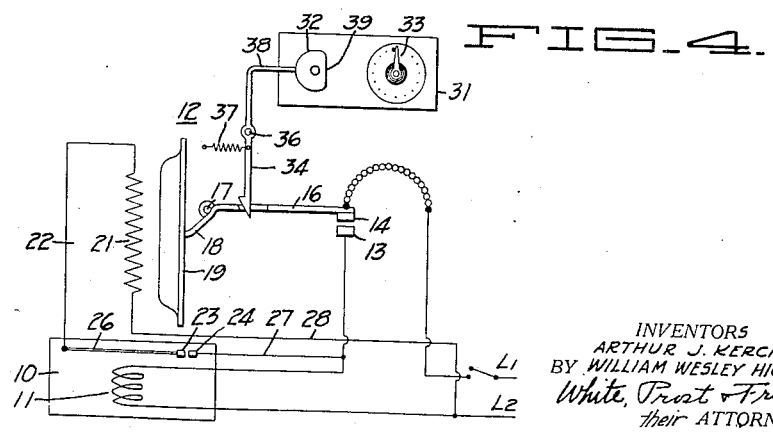
INVENTORS
ARTHUR J. KERCHER
BY WILLIAM WESLEY HICKS
White, Prost & Fryer
their ATTORNEYS Patented May 29, 1928.

1,671,593

UNITED STATES PATENT OFFICE.

ARTHUR J. KERCHER, OF BERKELEY, AND WILLIAM WESLEY HICKS, OF SAN FRANCISCO, CALIFORNIA.

TEMPERATURE-CONTROL SYSTEM.

Application filed March 5, 1927. Serial No. 173,110.

This invention relates generally to systems for controlling the temperature of a medium being heated, and has special application to electrical heating systems in which it is desired to maintain the temperature of a medium between certain limits.

It is an object of this invention to devise a novel method and system of control for electrical heating systems, which will minimize sudden fluctuations and will tend to keep the temperature of the medium being heated substantially constant.

It is an object of this invention to devise a temperature control system and a method of operating the same which will be provided with means in addition to the usual temperature responsive element for minimizing temperature fluctuations.

It is a further object of this invention to devise control means for an electrical heating system which will operate to recurrently open and close the circuit to the heating element after the temperature of the medium has reached a certain maximum limit and before the temperature has dropped below a certain minimum limit.

It is a further object of this invention to devise a novel form of switching means for controlling the current supplied to electrical heating elements, the switching means serving to repeatedly open and close the heating circuit after the closing of a thermostatically controlled circuit.

It is the further object of this invention to devise a novel form of electrical switch which will be automatically actuated in response to the closing of the control circuit, the switch incorporating an expansible cell having a buckled diaphragm.

It is a further object of this invention to devise an electrical control system for a heating device which may be adjusted so as to become inoperative after a predetermined lapse of time.

Further objects of the invention will appear from the following description in which we have set forth the preferred embodiment of our invention. It is to be understood that the appended claims are to be accorded a range of equivalents consistent with the status of the prior art.

Referring to the drawing:

Figure 1 is a side elevational view of an automatic switch suitable for incorporation with the system of this invention.

Fig. 2 is an end view of the switch shown in Fig. 1.

Fig. 3 is a plan view of the switch shown in Fig. 1.

Fig. 4 is a circuit diagram illustrating the system of this invention with the cell shown expanded and the switches shown in open circuit relation.

The invention comprises generally an electrical heating element which is in thermal contact with the medium being heated and which is energized from a main circuit. For opening and closing the main circuit there is provided an automatic switch which is actuated in response to the opening and closing of a control circuit. The control circuit includes a temperature responsive element which is also in thermal contact with the medium being heated. The control circuit and automatic switch are interrelated in such a manner that when the control circuit is closed in response to a predetermined maximum temperature condition of the medium, the switch repeatedly opens and closes the main circuit at timed intervals until the control circuit is opened, after which the switch remains closed. The repeated opening and closing of the main circuit after the medium has been heated to a certain maximum temperature tends to supply sufficient heat to the medium to normally keep it at practically constant temperature. A device is also provided in conjunction with the automatic switch for timing operation of the system.

Referring first to the system as shown in Fig. 4, the medium to be heated has been diagrammatically indicated at 10 and may consist of a gas, liquid or a solid. In thermal contact with this medium there is a heating element 11, this element being energized from a main circuit which includes the current supply lines $L_1$ and $L_2$. For controlling the main circuit there is provided the usual line switch 15 and an automatic switch indicated generally at 12, which for example may be of the type which employs an expansible cell as disclosed and claimed in the copending application of A. J. Kercher No. 665,704 filed September 29, 1923. A switch of this type is desirable since it is relatively slow in operation, in other words it requires a considerable time after being energized by an electrical current for the switch to open, and a corresponding amount of time for the switch to automatically close after the exciting current has been interrupted.

The switch as it has been diagrammatically shown in this view includes relatively movable contacts 13 and 14 which are connected in series with line $L_1$. Contact 14 is mounted upon the lever 16 which is pivotally mounted as at 17 and is provided with a projecting finger 18 contacting with the diaphragm of an expansible metallic cell 19, the construction of which will be presently described. In thermal contact with the expansible cell 19 there is an electrical heating element 21 which is energized from a control circuit indicated generally at 22. This control circuit includes the relatively movable contacts 23 and 24 of a thermostat element, and by means of conductors 27 and 28 is connected across the heating element 11. Any suitable kind of temperature responsive element may be employed although for the sake of reliability we prefer to use a metal rod 26 having a relatively high coefficient of expansion, one end of this rod being fixed while the other end carries the movable contact 23.

In order to time operation of the system there is provided a suitable clockwork mechanism 31. This timing mechanism serves to drive a cam 32 at a definite rate of speed. The rotation of cam 32 is indicated as being controlled by means of a visual setting device 33. Cooperating with cam 32 there is a latch 34 pivotally mounted as at 36 and biased as by means of spring 37 so as to normally be in position to engage the lever 16 when this lever is actuated to open contacts 13 and 14. A portion 38 of this latch engages the cam 32 so as to retain the latch out of engagement with lever 16 during normal operation of the switch. However when cam 32 is rotated to a position to permit portion 38 to ride upon the depressed cam surface 39, latch 34 will move to a position to engage and retain the switch lever 16 in open position.

In explaining the operation of the system as described above it will be presumed that the main circuit is energized by closing of line switch 15 and switch lever 16. Assuming that the medium 10 is initially relatively cool and that contacts 13 and 14 are closed, the heating element 11 will be energized to increase the temperature of medium 10. When the temperature reaches a certain predetermined maximum value contacts 23 and 24 are closed by expansion of rod 26, thus placing resistance 21 directly in shunt with heating element 11. Resistance element 21 will therefore be energized to supply heat to the expansible cell 19, and expansion of this cell serves to move switch lever 16 to open contacts 13 and 14 thus interrupting supply of current to the heating element 11. Resistance 21 is also de-energized with opening of contacts 13 and 14 so that expansible cell 19 cools and again permits contacts 13 and 14 to close to reestablish the circuit. After the main circuit has again been established resistance 21 is again energized to supply heat to expansion cell 19 and to open contacts 13 and 14. This opening and closing of the switch occurs repeatedly at regular timed intervals as long as contacts 23 and 24 remain closed, and in practice is sufficient to normally maintain the temperature of medium 10 substantially constant. However if the temperature of medium 10 drops below a certain minimum value due to dissipation of heat to other bodies or to the switching in of a heating resistance having a lower power consumption, then contacts 23 and 24 are opened, and upon the closing of contacts 13 and 14 resistance 21 will not be energized so that the switch will remain closed until the temperature has again been raised to the maximum value. The resultant effect of the system is therefore to heat the medium up to a certain maximum temperature, then to supply heat intermittently and at intervals sufficiently close together to keep the temperature substantially constant, and in case the temperature in time falls below a given minimum value to supply heat continuously until it has again reached the maximum value. Clockwork mechanism 31 may be utilized as a time control of the system and may be set so that cam 32 can effect the engagement or disengagement of latch 34 with lever 16.

One form of automatic switch suitable for use with the system described above is shown in Figs. 1 to 3 inclusive. This switch includes stationary contact 41 which are mounted upon a suitable insulating support 42. Cooperating with contact 41 are the movable contacts 43 which are mounted upon separate levers 44. Operatively disposed adjacent to levers 44 there is an expansible cell 46 which preferably comprises a metallic cup shaped member 47 having its front covered by a buckled spring metal diaphragm 48. Levers 44 are pivotally mounted as by means of a pivot 49 and are provided with portions 51 which engage the face of the buckled diaphragm 48. To provide a mounting for the various operable parts of the switch there is provided a back plate 52. The expansible cell 46 is secured to a suitable support member 53 as by means of screws 54, this support member 53 being preferably of insulating material which is a poor conductor of heat. Bolts 56 serve to retain support 53 and back plate 52 together, spacers 57 being employed to keep the same apart a certain distance. The insulating support 53 is retained in operative position by means of brackets 58 which are also engaged by bolts 56. Spacers 59 serve to position the switch levers 44 in proper relationship with respect to the expansible cell 46 so that when the diaphragm 48 is buckled inwardly the switch contacts are closed. Inserted between the insulating support 53 and the expansible cell 46, there is an electrical resistance or heating element 61 having its terminal wires 62 connected to suitable connection terminals 63 which may be conveniently mounted upon the insulated support 42. Connection terminals 64 may also be provided for the stationary switch contact 41 in order to make possible convenient connection with the temperature control system. When the switch contacts are intended to be connected in series with only one side of the current supply lines, the movable contacts 43 are connected together by means of the flexible insulated conductor 66.

In order to permit control of the automatic switch from a timing or clockwork mechanism, there is provided a latch 67 which is mounted upon the insulated support 42 as by means of a resilient L-shaped strip 68. Each of the switch levers 44 is provided with a projecting portion 69 which is adapted to engage the latch and retain the switch levers in open position for one position of latch 67. This latch is intended to be controlled by a cam or other actuator operated from suitable timing mechanism such as explained with reference to the system of Fig. 4.

In operating a switch of this kind when the heating element 61 is energized to supply heat to the cell 46, expansion of gas enclosed within the cell reaches a predetermined pressure after which the diaphragm 48 will be suddenly moved outwardly to its outer buckled position. This movement of the diaphragm lifts switches levers 44 to open the switch contacts, and as the movement of the diaphragm is very rapid practically no arcing will occur. When the current supplied to heating element 61 is interrupted, the expansion cell 46 cools and when its internal pressure has fallen below a predetermined value the diaphragm 48 is again forced inwardly by pressure of the outer atmosphere to permit the switch contacts to close. The particular advantage in using a buckled diaphragm is that it dispenses with complicated mechanism for securing quick opening of the contacts.

The system of this invention is particularly adapted for maintaining enclosed masses of fluid at practically constant temperature. For example it may be used for controlling the temperature of an electrical oven or for controlling the temperature of tanks of water. Because of its inherent mode of operation separation between contacts 23 and 24 of the temperature responsive element generally takes place when the automatic switch contacts 13 an 14 are open, with the result that no arcing occurs. For this reason the operation of the temperature responsive element is made more reliable and it may be constructed so that only a slight amount of movement is given to the contacts 23 and 24. Accordingly it is practical to employ simply a solid metal rod of the type indicated, thus obviating troubles due to molecular slippage as is experienced with bi-metallic thermostats.

We claim:

1. In a system for controlling the temperature of a medium, electrical means for heating said medium, an electrical circuit for energizing said heating means, and means for effecting timed variations of current supplied to said heating means after the temperature of the medium attains a certain maximum value.

2. In a system for controlling the temperature of a medium, electrical means for heating said medium, an electrical circuit for energizing said heating means, and means for interrupting said circuit at timed intervals after the temperature of the medium attains a predetermined maximum value.

3. In a system for controlling the temperature of a medium, electrical means for heating said medium, an electrical circuit for energizing said heating means, a temperature responsive element thermally associated with said medium, and means controlled by said element for interrupting said current at timed intervals after the temperature of the medium attains a predetermined maximum value.

4. In a system for controlling the temperature of a medium, electrical means for heating said medium, an electrical circuit for energizing said means, a temperature responsive element thermally associated with said medium, and means controlled by said element to open said circuit and repeatedly close the same when the temperature of the medium reaches a predetermined maximum value, and to maintain the circuit closed when the temperature of the medium falls below a predetermined minimum value.

5. In a system for controlling the temperature of a medium, electrical means for heating said medium, an electrical circuit for energizing said heating means, a temperature responsive element thermally associated with said medium, means controlled by said element for interrupting said current at recurrent intervals after the temperature of the medium reaches a predetermined maximum value, and means for permanently opening said circuit after the lapse of a predetermined period of time.

6. In a system for controlling the temperature of a medium, electrical means for heating said medium, an electrical circuit for energizing said heating means, a temperature responsive element thermally associated with said medium, means controlled by said element for repeatedly opening and closing said circuit, and means for rendering said last named means inoperable to close the circuit after the lapse of a predetermined period of time.

7. In a system for controlling the temperature of a medium, electrical means for heating said medium, a main electrical circuit for energizing said heating means, a temperature responsive element thermally associated with said medium, a control circuit adapted to be closed by said element when the temperature of the medium reaches a predetermined value, and means controlled by said control circuit for repeatedly opening and closing said main circuit while the control circuit remains closed.

8. In a system for controlling the temperature of a medium, a heating element for heating said medium, a main circuit for energizing said element, a temperature responsive element thermally associated with said medium, a control circuit adapted to be closed by said element and connected across said heating element, a switch in series with said main circuit, and means for repeatedly opening and closing of said switch responsive to closing of the control circuit.

9. The method of controlling heat supplied to a given medium comprising continuously supplying heat until the temperature reaches a predetermined maximum value, then supplying heat intermittently until the temperature falls below a given minimum value, and then supplying heat continuously until the temperature again reaches said maximum value.

In testimony whereof, we have hereunto set our hands.

ARTHUR J. KERCHER.
WILLIAM WESLEY HICKS.